United States Patent [19]

Rampini et al.

[11] Patent Number: 4,783,095

[45] Date of Patent: Nov. 8, 1988

[54] SUSPENSION FOR MOTORED AND UNMOTORED WHEELS OF VEHICLES

[75] Inventors: Franco Rampini; Stefano Rampini, both of Passignano sul Trasmeno, Italy

[73] Assignee: Janus Bus S.p.A., Rome, Italy

[21] Appl. No.: 40,312

[22] Filed: Apr. 20, 1987

[30] Foreign Application Priority Data

Apr. 29, 1986 [IT] Italy ................................. 47958 A/86

[51] Int. Cl.⁴ ............................................... B60G 3/00
[52] U.S. Cl. ..................................... 280/672; 280/693; 280/698
[58] Field of Search ............... 280/670, 672, 675, 688, 280/690, 691, 693, 696, 698

[56] References Cited

U.S. PATENT DOCUMENTS 2,155,521  4/1939  Zavarella ........................... 280/670
3,563,565  2/1971  Perlini ............................... 280/672

FOREIGN PATENT DOCUMENTS 3303551  8/1984  Fed. Rep. of Germany ...... 280/666
613625  12/1960  Italy .................................... 280/672
354343  6/1961  Switzerland ........................ 280/693

Primary Examiner—John J. Love
Assistant Examiner—Ross Weaver

Attorney, Agent, or Firm—Samuels, Gauthier, Stevens & Kehoe

[57] ABSTRACT

A suspension for motored and unmotored wheels of vehicles, having independent movements of bouncing/hoisting and rotation/steering, made up of a shaped bracket member coupled, at the rear, in a rigid way, with a vertical axle on which the vehicle structure runs, by means of the interposition of at least two bushes, and, at the top, in the front position, with the coupling axis being as close as possible to the reaction axis of the wheel with the ground, with the vehicle structure, such coupling being realized by means of an elastic and hoisting member and at least one damping member, said bracket member being also provided at a position intermediated between said axle and the wheel with a first ball joint and with a bearing as well as with a second ball joint and a second bearing, all arranged along an axis sloping at 3°–10° to the vertical, said first and second ball joints and first and second bearings being arranged resepctively at an upper and a lower position with respcet to the wheel axis and connecting said bracket member and the hub carried or reduction gear member so as to allow said wheel to rotate/steer; said suspension being also made up of a tie rod/strut member coupled at one end to said bracket member and, at the other end, to the vehicle structure.

9 Claims, 7 Drawing Sheets

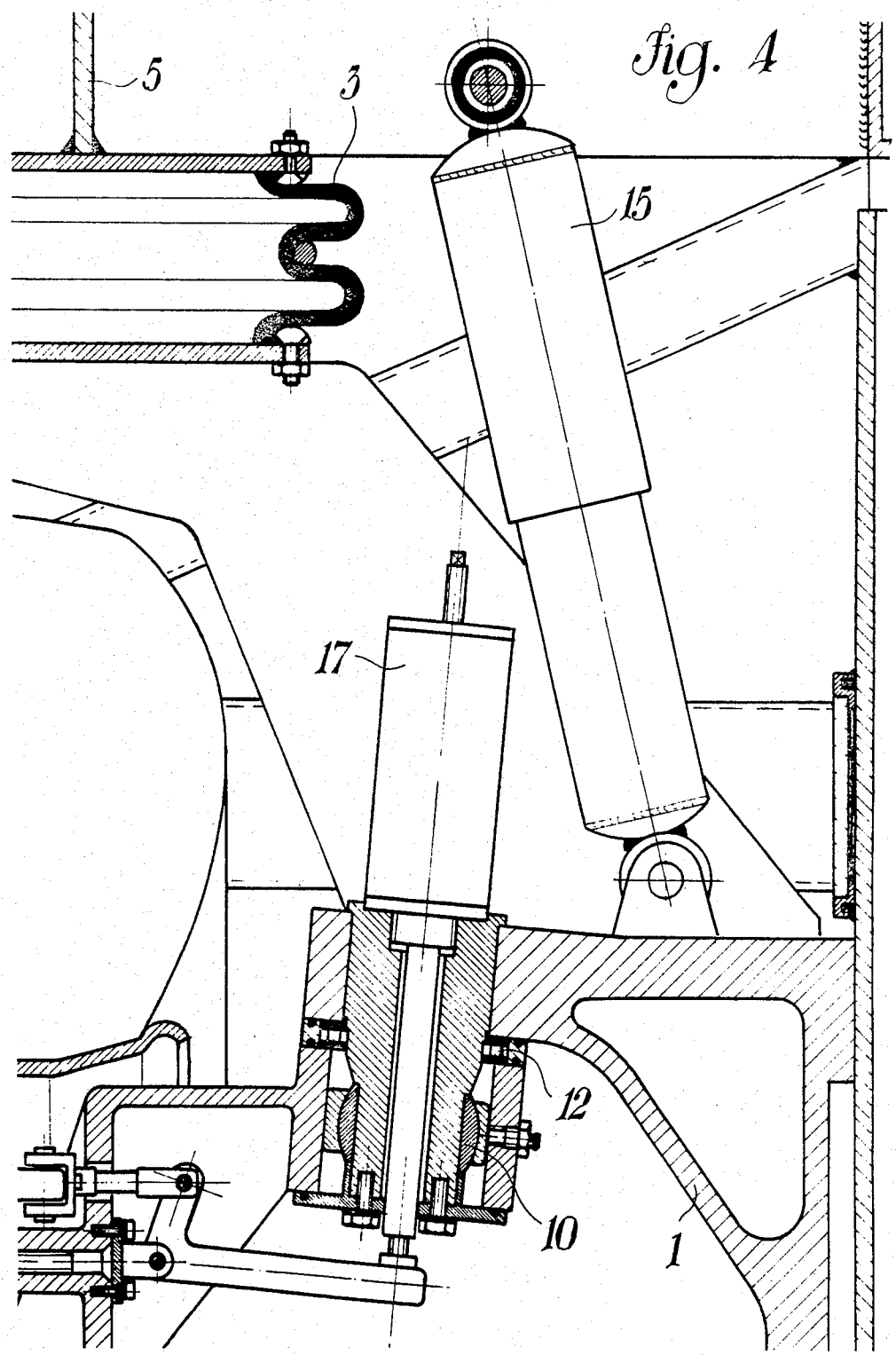

SUSPENSION FOR MOTORED AND UNMOTORED WHEELS OF VEHICLES

DISCLOSURE OF THE INVENTION

The present invention relates to a suspension for motored as well as unmotored wheels of vehicles. More particularly, the present invention is concerned with a suspension of the mentioned kind which is realized both structurally and functionally so as to be provided with independent bouncing/hoisting and rotation/ steering movements.

Moreover, the present invention relates to a suspension which is so realized as to have the axes along which the bouncing/hoisting and rotation/steering actions occur at such a position as to reduce the minimum value the lever arm of the forces present with respect to the reaction axis of the wheel on the ground so that the stresses that the vehicle structure particularly undergoes are kept to a minimum.

In order to realize the objects mentioned above, a basic technical teaching is supplied according to the present invention for realizing a suspension whose main member consists of a bracket supporting the whole very suspension, said bracket being so shaped as to allow the structure to be connected at the top part through an elastic member at a position which is very close to the reaction axis of the whell on the ground; as well as to allow the relative motion between said suspension and said structure to occur along a vertical axis located internally with respect to the wheel itself; and to allow the rotation/steering movement to occur along a sloping axis at a position intermediate between said vertical axis and said reaction axis so as to reduce the lever arm of the reaction forces to the minimum value allowed by the construction requirements.

Accordingly, it is a specific object of the present invention a suspension for motored as well as unmotored wheels of vehicles, which has independent bouncing/hoisting and rotation/ steering movements, said suspension being made up of a shaped bracket member coupled, at the rear, in a rigid way, to a vertical axle on which the vehicle structure runs or slides by means of the interposition of at least two bushes, said bracket member being coupled, at the top, in the front position, with the coupling axis as close as possible to the reaction axis of the wheel with the ground, to the vehicle structure, such coupling being realized by means of an elastic and hoisting member and at least a damping member, said bracket member being provided at a position intermediate between said axle and the wheel with a first ball joint and a first bearing as well as with a second ball joint and a second bearing all arranged along an axis which is at a 3°–10° slope with respect to the vertical, said first and second ball joints and first and second bearings being arranged, respectively, at the upper and the lower position with respect to the axis of the wheel and connecting said bracket member to a hub carrier or reduction gear carrier member so as to allow the rotation/steering movement of the wheel to occur; said suspension being also made up of a tie rod/strut member which is coupled at one end to said bracket member and, at the other end, to the structure of the vehicle.

It is to be observed that the whole system consisting of the vertical axle, the bushes, the elastic member and the damping member allows the bouncing/hoisting movements to occur whereas the first and the second ball joints as well as the first and second bearings allow the rotation/steering movements of the wheel to occur.

According to a preferred embodiment of the suspension of the present invention, said vertical axle can be realized with chromium plated and ground material, while the bushes may also be provided as realized with an antifriction material and two in number. The grinding of the axle is required to realize the sliding coupling with said bushes.

Again according to the present invention, said elastic and hoisting member can be made up of an air spring, while the damping member consists of a shock absorber whose seat can be obtained directly within said bracket member.

Alternatively, the hoisting can be of the hydraulic type and realized through a hydraulic jack located at a position between said air spring and the structure of the vehicle.

The choice of realizing the coupling axis between the vehicle structure and the elastic member at a position as close as possible to the reaction axis of the wheel on the ground, a choice from which the special shaping of the bracket member is stemming, is required by the need for keeping to a minimum value the forces acting on the structure of the vehicle itself. Accordingly, it is quite clear that said distance should go to zero value allowing for the construction requirements of the vehicle.

Further according to the present invention, the two bearings mentioned above can preferably be of the roll bearing type in order to limit the vertical overall dimensions as far as possible.

Moreover, the slope of said axis along which the ball joints and the bearings are provided is selected preferably within a range between 5° and 8°.

The embodiment of the suspension according to the present invention allows the same to be employed both for motored and for unmotored wheels as already mentioned quite widely above. In the case of motored wheels, the two bearings and the two ball joints will form the coupling members between the bracket member and the reducton gear carried member, and the bracket shaping will allow both an electric and a hydraulic motorization type to be provided.

In the unmotored wheel case, the coupling is realized with the hub carrier member and the suspension will be provided with service disk brake having a hydraulic caliper and a mechanical caliper with pneumatic unbraking spring and mechanical release for parking.

Moreover, it is necessary to state more precisely that the tie rod/strut member is provided in order to support loads directed parallel to the longitudinal axis of the vehicle, such as for instance friction with the ground, accelerations and decelerations and that said member is coupled to the vehicle and to the bracket member so as to allow the bouncing/hoisting movement to occur.

The present invention will be disclosed in the following with particular reference to some preferred embodiments of the same and to the figures of the enclosed drawings, wherein:

FIG. 4 shows the detail pointed out by the letter A in FIG. 1; and

Figure 1:
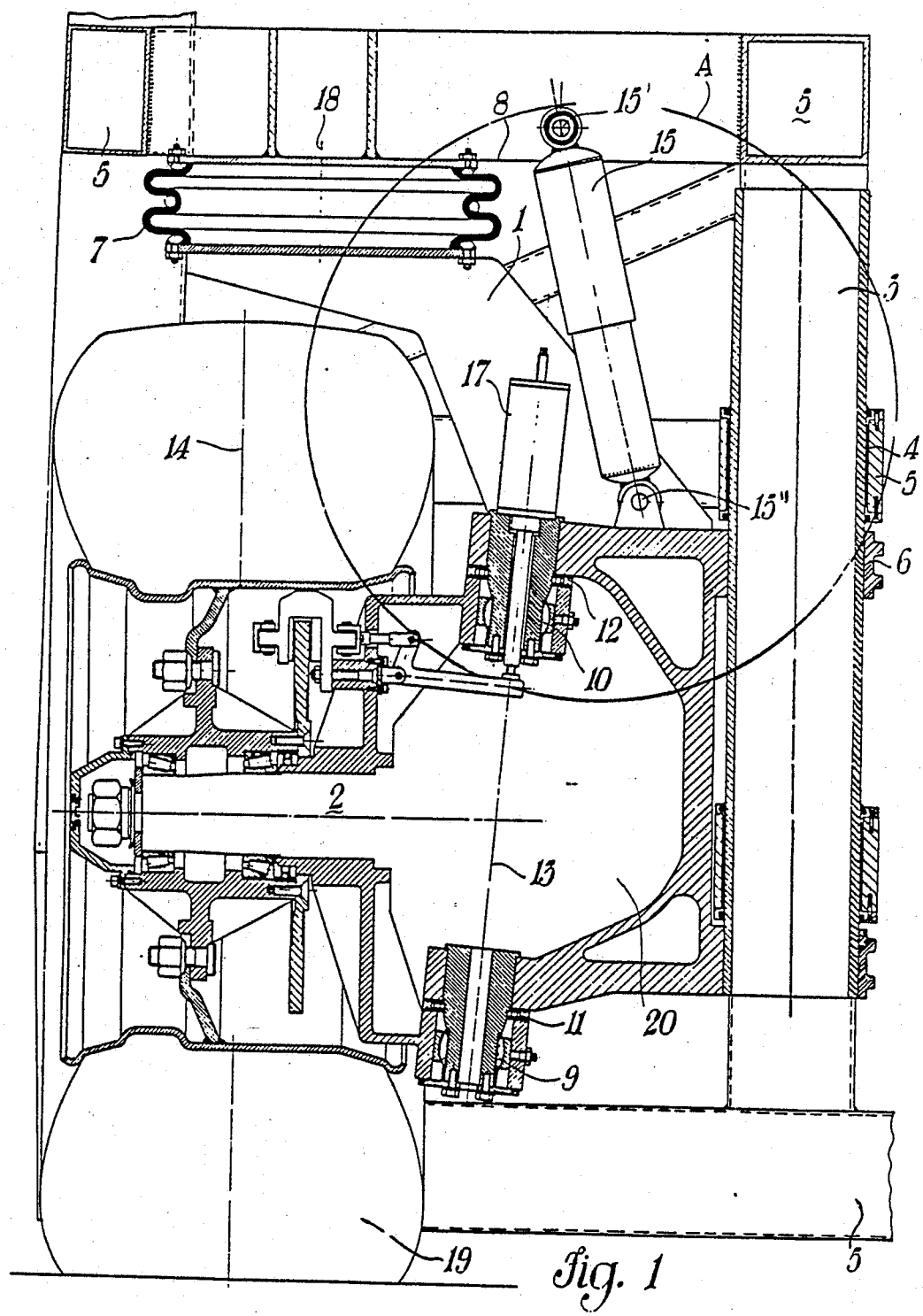
FIG. 1 is a partial cross section side view of the suspension according to the present invention in the unmotored case.

With reference now more particularly to FIGS. 1-4, it can be observed that the main member of the suspension according to the present invention is made up of the bracket 1. Said bracket 1 is the member that supports the very suspension itself.

The suspension is provided a the center position with a hub carrier member 2 which forms the central member of said suspension and allows the rotation about the vertical axis in the way disclosed in the following.

The bouncing/hoisting movements of the suspension occur along a vertical axle 3, which is preferably chromium plated and ground, through two bushes 4 realized with an antifriction material which are connected to the structure 5 of the vehicle.

More particularly, the grinding of the axle 3 is required in order to make use of said bushes 4.

Said axle 3 is rigidly connected to the supporting bracket 1 by means of the anchoring members 6. Said bracket 1 in turn is anchored to the wheelhouse 8 of said structure 5 through the interposition of the spring 7 (to which reference will be made in the following).

According to a different way, in order to allow the rotation/steering movement independently of the bouncing/hoisting movement, the ball joints 9 and 10 as well as the roll bearings 11 and 12 are provided on said bracket 1 which allow the rotation about the vertical axis to occur. The axis along which the ball joints 9 and 10 and the roll bearings 11 and 12 are arranged, which is pointed out with 13 in the Figure, is at 5° slope to the vertical.

The ball joints 9 and 10 allow the radial loads to be absorbed whereas the roll bearings 11 and 12 will absorb the vertical loads. The choice of the roll bearings is mainly dictated by the need for limiting the vertical overall dimensions as far as possible.

The roll bearings 11 and 12 as well as the bushes 4 are protected by gaskets which prevent dirt from leaking into the device.

The slope of the axis 13 to the vertical is determined so as to reduce the lever arm between said axis 13 and the reaction axis 14 of the wheel to the minimum value allowed by the problems connected to the realization of the suspension itself.

According to the embodiment shown in the Figures enclosed herein, the elastic member of the suspension is made up of the air spring 7 acting cooperatively with the shock absorber damping member 15. In such embodiment, a single member 11 is provided whose seat or housing can be obtained possibly direct inside the bracket 11.

The damping member 15 is fastened at point indicated with reference 15' to the wheelhouse 8 of the structure 15, and at point indicated with reference 15" to the bracket 1 of the suspension.

In that case, the air spring 7 acts both as the elastic member and as the hoisting member.

The bouncing/hoisting movement can be also of the hydraulic type, realized through a jack placed between the spring 7 and the wheelhouse 8, so that the hoisting movement occurs through said jack, while the spring 7 acts just as the elastic member.

Figure 2A:
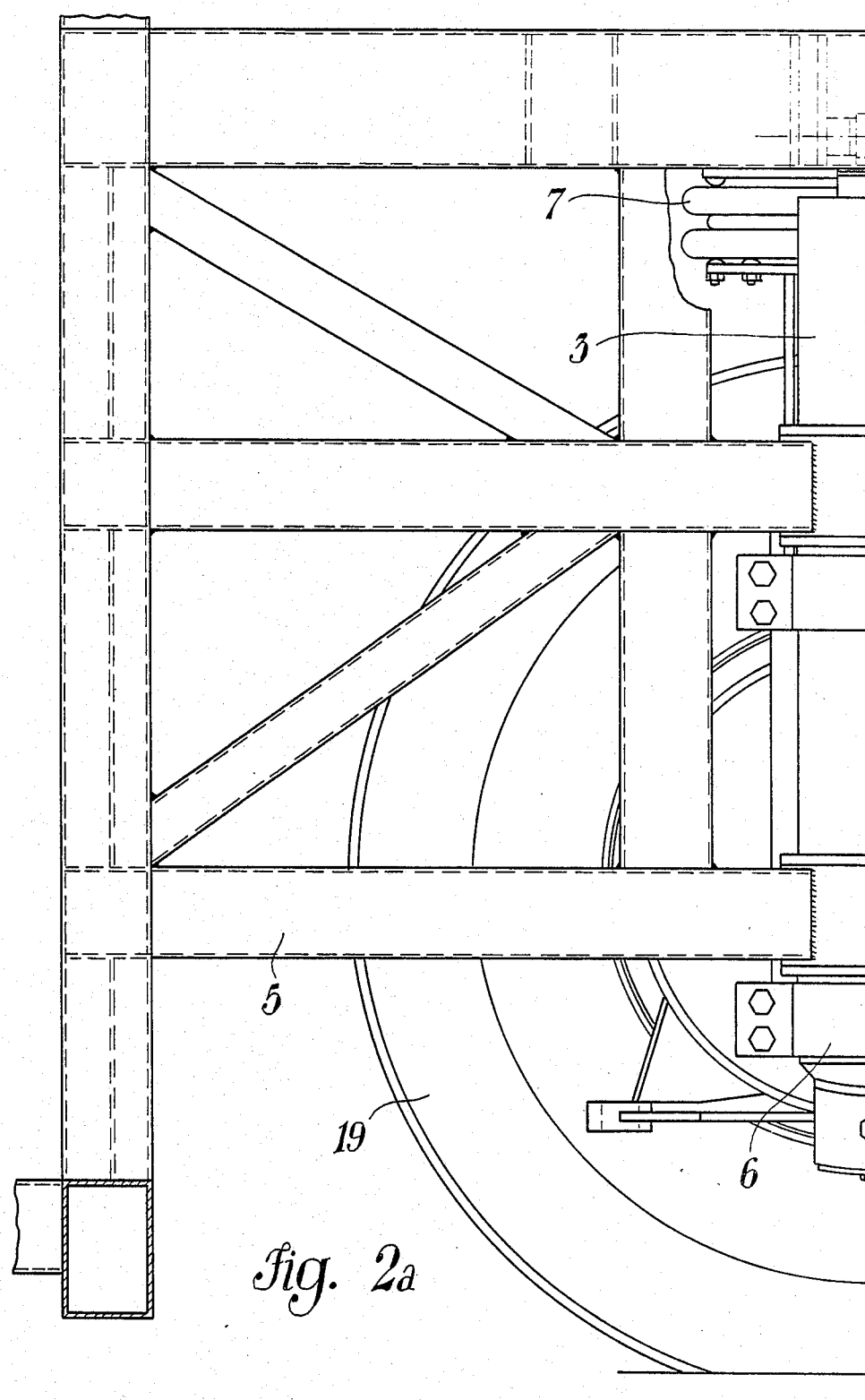
FIGS. 2a and 2b show a front view of the suspension shown in FIG. 1.
Figure 2B:
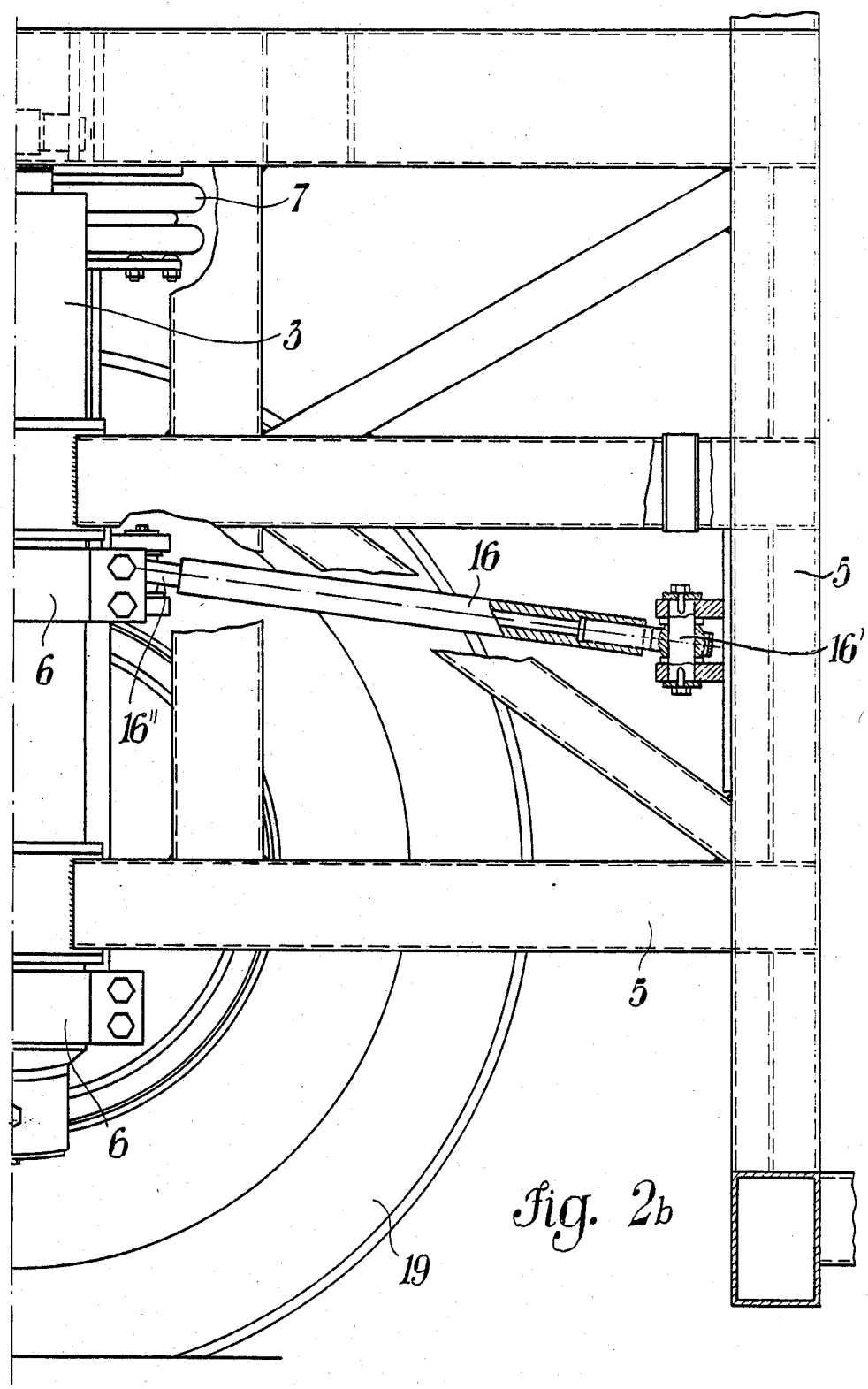
Figure 3A:
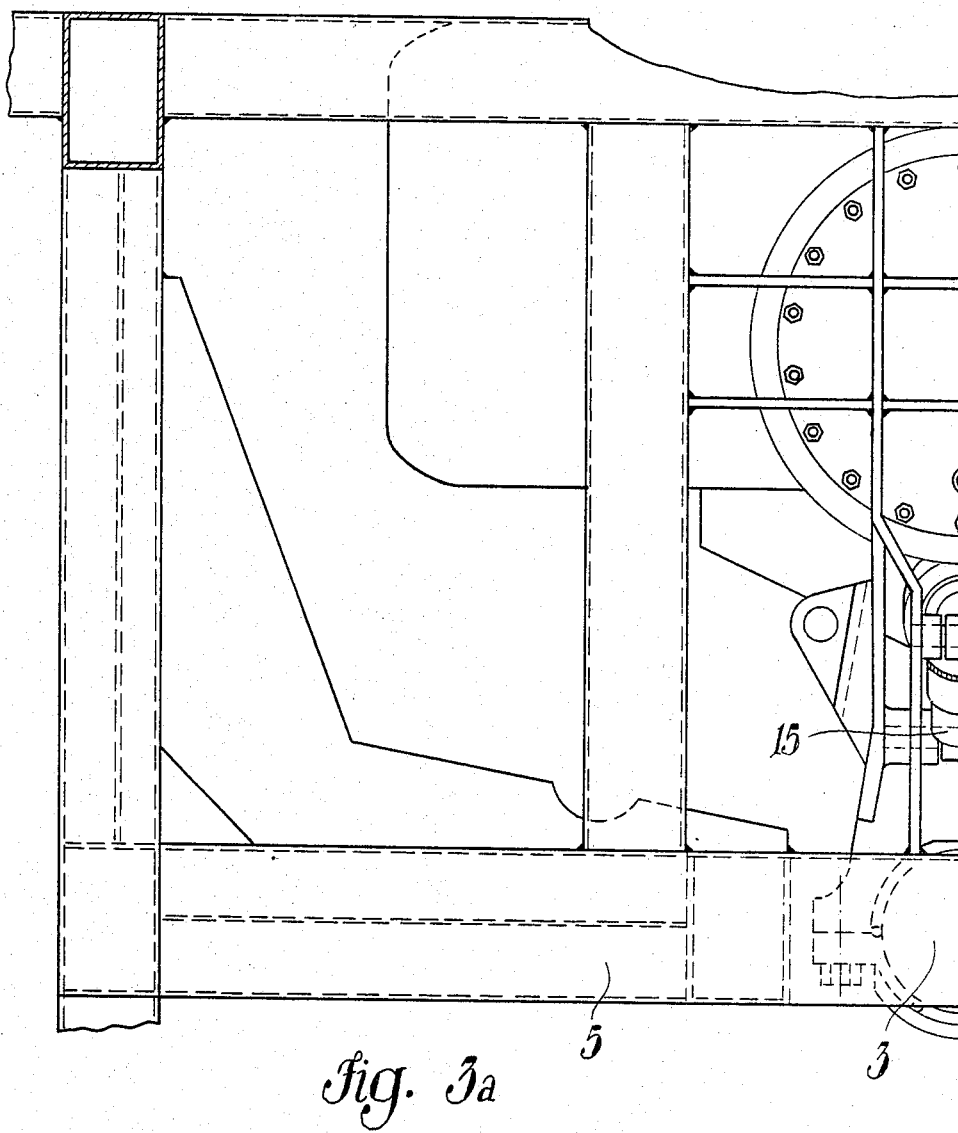
FIGS. 3a and 3b show a plan view of the suspension of FIG. 1.
Figure 3B:
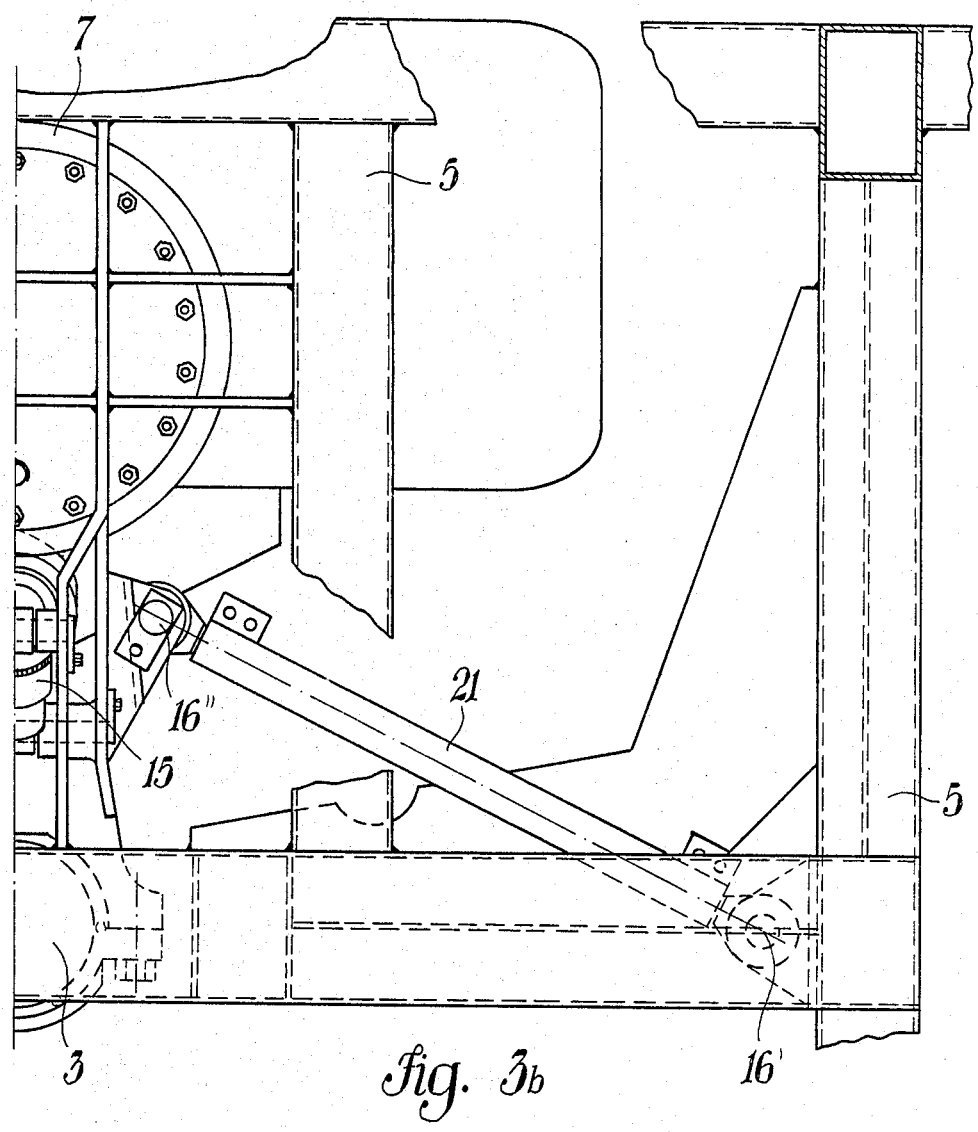

The bracket 1 of the suspension is rigidly connected to the wheelhouse 8 of the structure 5 by means of a tie rod/strut 16 (see in particular FIGS. 2b and 3b). Said tie rod/strut 16 is provided in order to prevent the suspension from rotating freely about the vertical axle 3. Moreover, it supports loads acting in a direction parallel to the longitudinal axis of the vehicle, i.e. loads stemming from acceleration or braking as well as loads stemming from friction.

It can be observed in such Figures that the tie rod/strut 16 is connected at point indicated with reference 16' to the structure 5 of the vehicle and at point indicated with reference 16" in the front part to the vertical axle 3 at a point corresponding to the upper anchoring member 6 through joints which do not prevent the wheel from undergoing bouncing/hoisting movements but, as already mentioned above, prevent the suspension itself from rotating freely about the vertical axle 3.

The suspension illustrated in FIGS. 1-4 is also provided in addition with service disk brake with a mechanical spring and a mechanical caliper which is provided with a pneumatic unbraking spring and mechanical release for parking (pointed out with reference number 17).

The particular configuration of the bracket 1 of the suspension according to the present invention, which is realized as a single casting has been studied in a particular way so as to obtain a lever arm between the reaction axis 14 of the wheel on the ground and the axis of the structure (the axis with the reference number 18) of the lowest possible value to reduce to a minimum all stresses on the strucutre itself.

It is quite clear that the best solution would be that in which said lever arm is of zero value, but such requirement is to be reconciled with the construction requirements concerning the position of the spring as well as the possibility of having access to the zone where the wheel 19 is assembled.

Figure 5:
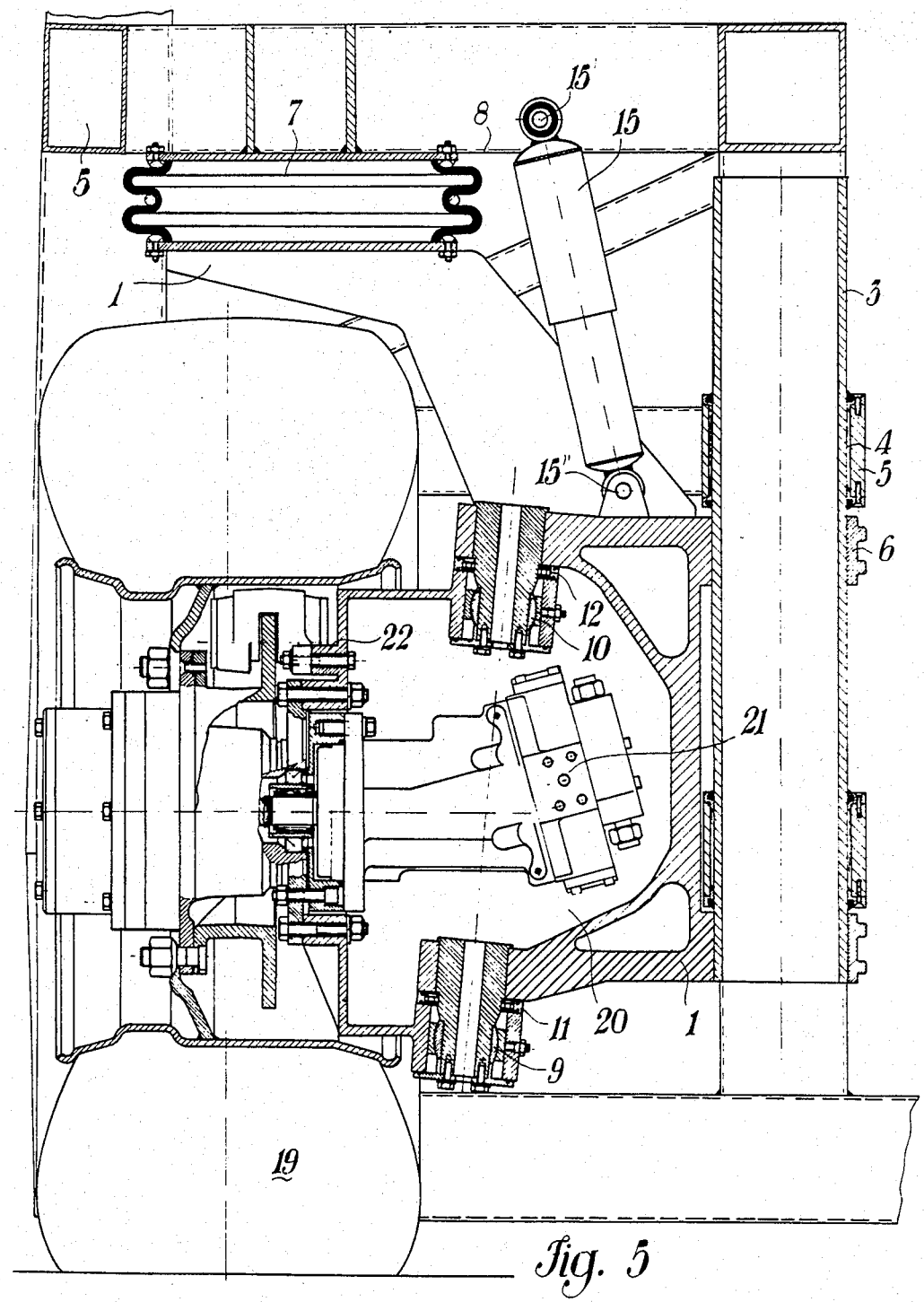
FIG. 5 shows a partial cross section side view of the suspension according to the present invention as relative to the motored case.

As already mentioned above, the suspension according to the present invention is realized in such a way that it can be mounted both on motored and on unmotored wheels. FIG. 5 shows an example of employment of said suspension in connection with a motored wheel.

Such possibility of interchangeable employment is particularly due to the mentioned conformation of the bracket 1 which allows the motorization group 21 to be housed because of the obtainment of the recess 20.

As can be observed in FIG. 5, wherein members corresponding to those shown in the Figures illustrated above are pointed out with the same reference numbers, the only substantial difference between the two solution consists in providing said motorization group 21 instead of the members that form the parking brake (the reference number 17 of the same being pointed out in FIG. 1).

Obviously, the reduction gear carrier 22 will be provided instead of the hub carrier 2.

The motorization group 21 can be indifferently of the hydraulic or of the electric type.

The present invention has been disclosed according to some preferred embodiments of the same but it is to be understood that modifications and/or changes can be introduced in the same by those who are skilled in the art without departing from the spirit and scope of the invention for which a priority right is claimed.

We claim:

1. A suspension for motored and unmotored wheels of vehicles, characterized in that it is made up of a shaped bracket member which is rigidly coupled, at the rear, to a vertical axle on which the structure of the vehicle slides, by means of the interposition of at least two bushes, and, at the top, in the front position, is coupled to the structure of the vehicle with the coupling axis as close as possible to the reaction axis of the wheel on the ground, such latter coupling being obtained by means of an elastic and hoisting member and at least a damping member, said bracket member being also provided, with a first ball joint and a first bearing as well as with a second ball joint and a second bearing, said first ball joint and first bearing and said second ball joint and second bearing arranged along an axis at 3°-10° slope to the vertical and at a position intermediate said vertical axle and the wheel, such as to allow said wheel to rotate/steer independently of the bouncing hoisting movement; said first ball joint and bearing and said second ball joint and bearing being respectively at upper and lower positions with respect to the axle of the wheel whereby said bracket member can be connected to a hub carrier member or a reduction gear carrier member; further said suspension being also made up of a tie rod/strut member which is coupled at one end to said bracket member and, at the other end, to the structure of the vehicle.

2. A suspension according to claim 1, characterized in that said vertical axle is made up of a ground, chromium plated material.

3. A suspension according to claim 1, characterized in that said at least two bushes are made up of an antifriction material.

4. A suspension according to claim 1, characterized in that said elastic and hoisting member consists of an air spring, said damping member being made up of a shock absorber.

5. A suspension according to claim 1, characterized in that said elastic and hoisting member consists of an air spring and of a hydraulic jack placed between said spring and the structure of the vehicle, the damping member being made up of a shock absorber.

6. A suspension according to claims 4 or 5, characterized in that said shock absorber is housed within a seat obtained in the bracket member.

7. A suspension according to claim 1, characterized in that said first and second bearings are made up of roll bearings.

8. A suspension according to claim 1, characterized in that the slope of said axis along which the ball joints and the bearings are provided is in the range between 5° and 8°.

9. A suspension according to claim 8, characterized in that said slope is of 5°.

* * * * *